US012137320B2

(12) United States Patent
Li et al.

(10) Patent No.: US 12,137,320 B2
(45) Date of Patent: Nov. 5, 2024

(54) SPEAKER AND TERMINAL

(71) Applicant: Huawei Technologies Co., Ltd., Shenzhen (CN)

(72) Inventors: Shizhe Li, Shanghai (CN); Yang Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 17/760,638

(22) PCT Filed: Sep. 11, 2020

(86) PCT No.: PCT/CN2020/114640
§ 371 (c)(1),
(2) Date: Mar. 15, 2022

(87) PCT Pub. No.: WO2021/052243
PCT Pub. Date: Mar. 25, 2021

(65) Prior Publication Data

US 2022/0337942 A1 Oct. 20, 2022

(30) Foreign Application Priority Data

Sep. 17, 2019 (CN) ........................ 201910878306.X

(51) Int. Cl.
*H04R 1/34* (2006.01)
*H04R 1/28* (2006.01)
*H04R 11/02* (2006.01)

(52) U.S. Cl.
CPC ........... *H04R 1/345* (2013.01); *H04R 1/2857* (2013.01); *H04R 11/02* (2013.01); *H04R 2499/11* (2013.01)

(58) Field of Classification Search
CPC ...... H04R 1/345; H04R 1/2857; H04R 11/02; H04R 2499/11; H04R 7/04; H04R 9/043;
(Continued)

(56) References Cited

U.S. PATENT DOCUMENTS 5,471,018 A 11/1995 Nieuwendijk et al.
2017/0171662 A1 6/2017 Russell
(Continued)

FOREIGN PATENT DOCUMENTS

CN 204634021 U 9/2015
CN 205389261 U 7/2016
(Continued)

*Primary Examiner* — Carolyn R Edwards
*Assistant Examiner* — Julie X Dang
(74) *Attorney, Agent, or Firm* — Conley Rose, P.C.

(57) ABSTRACT

A terminal speaker includes an enclosure with accommodating space with an affixed sound production monomer. The sound production monomer has a diaphragm configured to vibrate to produce sound. The enclosure includes a first inner bottom wall and an inner sidewall fastened to the first inner bottom wall. The diaphragm is fastened to the inner sidewall, dividing the accommodating space into front and rear cavities. The first inner bottom wall is in the front cavity. A sound outlet hole penetrates the inner sidewall. The front cavity is in communication with the sound outlet hole by a front cavity channel. The diaphragm is tilted relative to the first inner bottom wall. The perimeter of the end of the front cavity in communication with the sound outlet hole is greater than the perimeter of the end of the front cavity remote from the sound outlet hole.

20 Claims, 18 Drawing Sheets

(58) Field of Classification Search
CPC . H04R 1/06; H04R 7/18; H04R 9/041; H04R 31/00; H04R 9/06; H04R 7/127; H04R 9/025; H04R 2400/11; H04R 1/021; H04R 7/20; H04R 1/24; H04R 2499/15
USPC .................................. 381/388, 397, 400, 337
See application file for complete search history.

(56) References Cited

U.S. PATENT DOCUMENTS

| | | | | |
|---|---|---|---|---|
| 2019/0158945 | A1 | 5/2019 | Igarashi et al. | |
| 2019/0268692 | A1* | 8/2019 | Zero | G01F 1/36 |
| 2020/0045440 | A1* | 2/2020 | Zhou | H04R 1/023 |

FOREIGN PATENT DOCUMENTS

| | | | | |
|---|---|---|---|---|
| CN | 106303859 | A | | 1/2017 |
| CN | 206136278 | U | | 4/2017 |
| CN | 207075082 | U | | 3/2018 |
| CN | 109788395 | A | | 5/2019 |
| CN | 208940223 | U | * | 6/2019 |

* cited by examiner

SPEAKER AND TERMINAL

CROSS-REFERENCE TO RELATED APPLICATIONS

This is a U.S. National Stage of International Patent Application No. PCT/CN2020/114640 filed on Sep. 11, 2020, which claims priority to Chinese Patent Application No. 201910878306.X filed on Sep. 17, 2019. Both of the aforementioned applications are hereby incorporated by reference in their entireties.

This application claims priority to Chinese Patent Application No. 201910878306.X, filed with the China National Intellectual Property Administration on Sep. 17, 2019 and entitled "SPEAKER AND TERMINAL", which is incorporated herein by reference in its entirety.

TECHNICAL FIELD

This application relates to the field of acoustic technologies, and in particular, to a speaker and a terminal.

BACKGROUND

Currently, a speaker is an important part of a terminal such as a mobile phone or a tablet computer, and a sound effect is extremely important for user experience.

FIG. 1 shows a common existing speaker 10*a*. The sound production monomer 13*a* is fastened to and accommodated in an enclosure 11*a*. The sound production monomer 13*a* includes a diaphragm 131*a* that vibrates to produce a sound. A front cavity 101*a* connected to a sound outlet hole 111*a* is formed by the diaphragm 131*a* and an inner wall of the enclosure 11*a*. Air pushed by the diaphragm 131*a* passes through the front cavity 101*a* and flows out from the sound outlet hole 111*a* to produce a sound. If an airflow velocity in the front cavity 101*a* is extremely high, turbulence occurs. If an airflow in the front cavity 101*a* encounters a structural mutation, a vortex occurs. Both the turbulence and the vortex generate noise. It is found, by simulating the speaker 10*a* by using software, that a region in which the speaker 10*a* generates the turbulence and the vortex most seriously is a region on a side that is of the diaphragm 131*a* and that is close to the sound outlet hole 111*a*, for example, a region II shown in FIG. 2 and a region III shown in FIG. 3. The region II is a region with much abnormal noise of an airflow, and the region III is a region with an extremely high airflow velocity. A main reason is as follows: Referring to FIG. 4, in a Z direction, because of a ring 1311*a* that is of the diaphragm 131*a* and that is disposed toward the front cavity 101*a*, a size of a side that is of the front cavity 101*a* and that is close to the sound outlet hole 111*a* is much smaller than that of another region. Consequently, the speaker 10*a* is prone to noise, and a sound effect is poor, affecting user experience.

SUMMARY

A technical problem to be resolved in embodiments of this application is to provide a speaker and a terminal that can reduce noise and improve a sound effect.

To achieve the foregoing objective, the following technical solutions are used in implementations of this application.

According to a first aspect, an embodiment of this application provides a speaker, including an enclosure with accommodating space and a sound production monomer fastened in the accommodating space. The sound production monomer has a diaphragm that vibrates to produce a sound, the enclosure includes a first inner bottom wall and an inner sidewall fastened to the first inner bottom wall, the diaphragm is fastened to the inner sidewall to isolate the accommodating space into a front cavity and a rear cavity, the first inner bottom wall is located in the front cavity and is disposed opposite to the diaphragm, a sound outlet hole penetrates through the inner sidewall, the front cavity is in communication with the sound outlet hole to form a front cavity channel, the diaphragm is tilted relative to the first inner bottom wall, and a diameter of an end of the front cavity that is in communication with the sound outlet hole is greater than a diameter of an end of the front cavity that is away from the sound outlet hole.

In this implementation, the diaphragm is tilted relative to the first inner bottom wall, and the diameter of the end of the front cavity that is in communication with the sound outlet hole is greater than the diameter of the end of the front cavity that is away from the sound outlet hole. In other words, an in-cavity cross-sectional area of the end of the front cavity that is in communication with the sound outlet hole is greater than an in-cavity cross-sectional area of the end of the front cavity that is away from the sound outlet hole, so that a cross section of the front cavity is roughly horn-shaped, thereby making an airflow gentle, reducing turbulence intensity, and reducing intensity of a vortex caused by a structural mutation of a side of the diaphragm that is adjacent to the sound outlet hole, for example, a structural mutation of the front cavity that is caused by a height of a ring of the diaphragm. Because vortex and turbulence intensity of the front cavity channel are reduced, noise is reduced, a sound effect of the speaker is improved, and user experience is improved.

In an implementation, a diameter of the front cavity channel gradually increases from the end of the front cavity that is away from the sound outlet hole to an end of the sound outlet hole that is away from the front cavity, in other words, the front cavity channel is also roughly horn-shaped, so that connection space between the sound outlet hole and the front cavity is expanded, an airflow can be gentle, turbulence intensity and noise are reduced, and a sound effect of the speaker is further improved.

In an implementation, the diaphragm includes a ring protruding toward the front cavity, a hole wall of the sound outlet hole includes a first hole wall and a second hole wall that are disposed opposite to each other, the second hole wall is fastened to the first inner bottom wall, the first inner bottom wall is located on one side of an extension line of the first hole wall, the ring is located on the other side of the extension line that is away from the first inner bottom wall, and a shortest distance between the ring and the extension line is not less than 0. In this way, resistance impact on an airflow flowing in the front cavity that is caused by the ring is reduced, a vortex can be reduced, and noise is further reduced.

In an implementation, the first hole wall and the second hole wall are tilted relative to a second direction toward a side on which the sound production monomer is located, to guide a flow direction of an airflow, that is, further guide sound propagation.

In an implementation, a first installation console is disposed on the inner sidewall, and the first installation console is fastened to the sound production monomer, to expand a connection region between the sound production monomer and the inner sidewall, thereby improving stability of supporting the sound production monomer by the enclosure.

In an implementation, the first installation console includes a top surface disposed away from the first inner bottom wall, a height of an end of the top surface that is adjacent to the sound outlet hole relative to the first inner bottom wall is greater than a height of an end of the top surface that is away from the sound outlet hole relative to the first inner bottom wall, and the top surface is fastened to a surface of the diaphragm that faces the first inner bottom wall, so that the sound production monomer is tilted relative to the second direction. The first installation console provides a cushion and support for an end of the sound production monomer that is adjacent to the sound outlet hole, to improve reliability of the speaker.

In an implementation, the first installation console includes a first installation part and a first pad part that are fastened, the first installation part is fastened to the diaphragm, the first pad part extends in a direction in which the sound outlet hole is located, and a height of a top surface of the first pad part that is away from the first inner bottom wall relative to the first inner bottom wall gradually increases from an end of the first pad part that is away from the sound outlet hole to an end of the first pad part that is adjacent to the sound outlet hole, so that connection stability between the enclosure and the diaphragm is improved.

In an implementation, a stopper console is further disposed on the inner sidewall, a height of the first installation console relative to the first inner bottom wall is less than a height of the stopper console relative to the first inner bottom wall, the first installation console is disposed around the ring, and the stopper console is disposed around and fastened to the sound production monomer, where the stopper console and the first installation console are disposed in a form of steps. Because the sound production monomer is fastened to the inner sidewall by using the first installation console and the stopper console, connection stability between the sound production monomer and the enclosure is further improved, so that reliability of the speaker is further improved.

In an implementation, the enclosure further includes a plurality of locking protrusions, the plurality of locking protrusions protrude, at intervals, from a surface of the first installation console that is away from the first inner bottom wall, and are fastened to the stopper console, and the locking protrusions are opposed to the sound production monomer, so that a possibility that the sound production monomer is loose and shakes can be reduced, thereby improving sound quality of the speaker.

In an implementation, a gluing groove is enclosed by each two adjacent locking protrusions and the stopper console together, so that glue is dispensed, and a glue overflow possibility is reduced. In addition, a sealed connection between the sound production monomer and the enclosure is implemented, and water resistance and air tightness of the speaker are improved.

In an implementation, the enclosure includes a first housing and a second housing, the first housing and the second housing form the accommodating space together, the first housing has the first inner bottom wall and an inner sidewall fastened to the first inner bottom wall, and the second housing is fastened to an end of the inner sidewall that is away from the first inner bottom wall, so that assembly of the speaker is easier.

In an implementation, the second housing includes a second inner bottom wall and a second installation console protruding from the second inner bottom wall, and the second installation console is fastened to a side of the sound production monomer that is away from the first inner bottom wall, so that a rear cavity region formed by the sound production monomer and the enclosure is expanded, thereby improving a sound effect of the speaker.

In an implementation, the second installation console includes an installation part and a second pad part that are fastened, the installation part is fastened to a side of the sound production monomer that is away from the diaphragm, a top surface of the second pad part that is away from the second inner bottom wall abuts against the side of the sound production monomer that is away from the diaphragm, and a height of the top surface of the second pad part that is away from the second inner bottom wall relative to the second inner bottom wall gradually decreases from an end of the second pad part that is away from the sound outlet hole to an end of the second pad part that is adjacent to the sound outlet hole, so that the sound production monomer is stably accommodated in the first housing, thereby reducing a possibility that the sound production monomer is loose and shakes.

In an implementation, the first housing includes a body and a support plate, one end of the body is fastened to the second housing, a through-hole is disposed at an end of the body that is away from the second housing, the support plate is fastened to the body and covers the through-hole, the support plate is disposed opposite to the diaphragm, the first inner bottom wall includes an inner bottom wall that is of the support plate and that is disposed toward the diaphragm, and strength of the support plate is greater than strength of the body. Because the strength of the support plate is greater than the strength of the body, strength of the enclosure can be increased, space of the speaker can be reduced, and the sound production monomer can dissipate heat more easily.

In an implementation, the speaker further includes a flexible part, and the flexible part is sandwiched between a surface of the second housing that faces the sound production monomer and the sound production monomer. The flexible part is configured to prevent looseness between the sound production monomer and the second housing, so that reliability of the speaker is improved.

In an implementation, the inner sidewall of the first housing is a first inner sidewall, the second housing further includes a second inner sidewall formed by bending and extending an edge of the second inner bottom wall, the second inner sidewall is fastened to an end of the first inner sidewall that is away from the first inner bottom wall, the second inner sidewall and the first inner sidewall constitute an inner sidewall of the enclosure, and the sound outlet hole is disposed on at least one of the second inner sidewall and the first inner sidewall.

In an implementation, a through-hole is disposed on the second inner bottom wall, the second housing further includes a second installation console disposed toward the sound production monomer from the second inner bottom wall, the second installation console is disposed around the through-hole of the second housing, and a surface of the second installation console that is away from the second inner bottom wall is glued to a surface of the sound production monomer that is away from the first inner bottom wall, so that a sealed connection between the sound production monomer and the second housing is implemented. In addition, the through-hole of the second inner bottom wall facilitates heat dissipation of the speaker.

In an implementation, the diaphragm includes a main body and a dome, a through-hole is disposed on the main body, the main body includes a first connection part, the ring, and a second connection part, the ring is fastened between the first connection part and the second connection part, the first connection part is disposed around the ring, the ring is disposed around the second connection part, the second connection part is disposed around the through-hole, the first connection part is fastened to a top surface of the first installation console that is away from the first inner bottom wall, and the dome is fastened to the second connection part of the main body, is disposed toward a surface of the first inner bottom wall, and covers the through-hole.

According to a second aspect, an embodiment of this application further provides a terminal, including the speaker described above and a processor. The processor is electrically connected to the speaker.

In an implementation, the terminal is one of a smartphone, a smart watch, a tablet computer, a personal digital assistant, a sales terminal, an in-vehicle computer, a desktop computer, a notebook computer, a smart television, and a game console.

DESCRIPTION OF EMBODIMENTS

First Implementation

Figure 1:
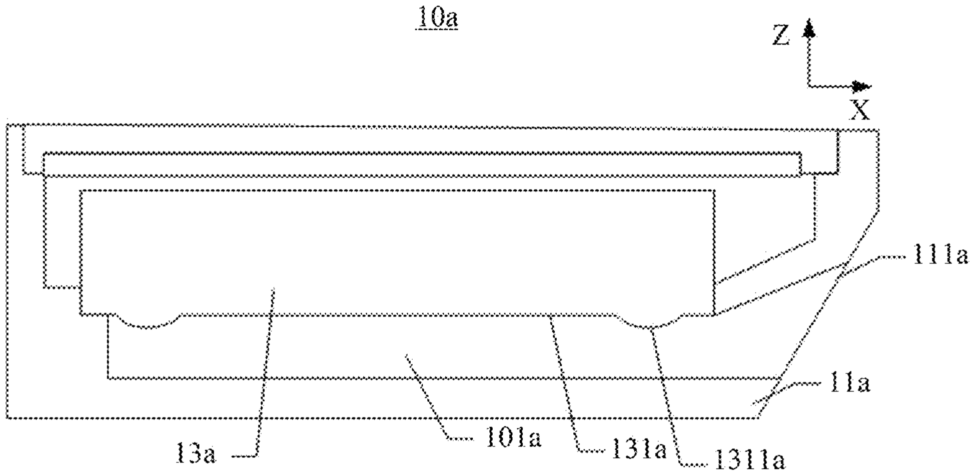
FIG. 1 is a cross-sectional view of a speaker in the conventional technology.
Figure 2:
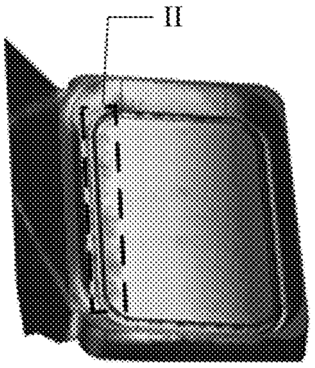
FIG. 2 is a schematic diagram of simulation of airflow noise of the speaker shown in FIG. 1.
Figure 3:
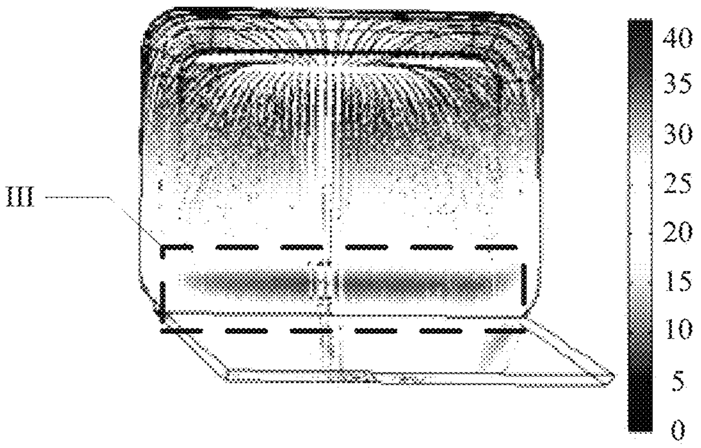
FIG. 3 is a schematic diagram of simulation of an airflow velocity field of the speaker shown in FIG. 1.
Figure 4:
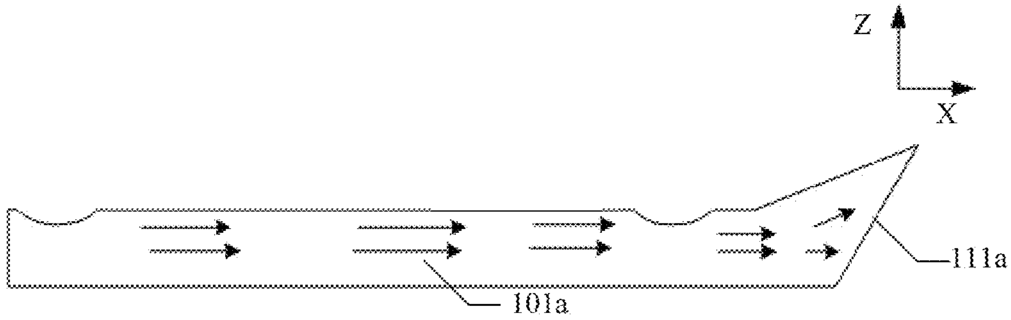
FIG. 4 is a schematic diagram of a front cavity channel of the speaker shown in FIG. 1.
Figure 5:
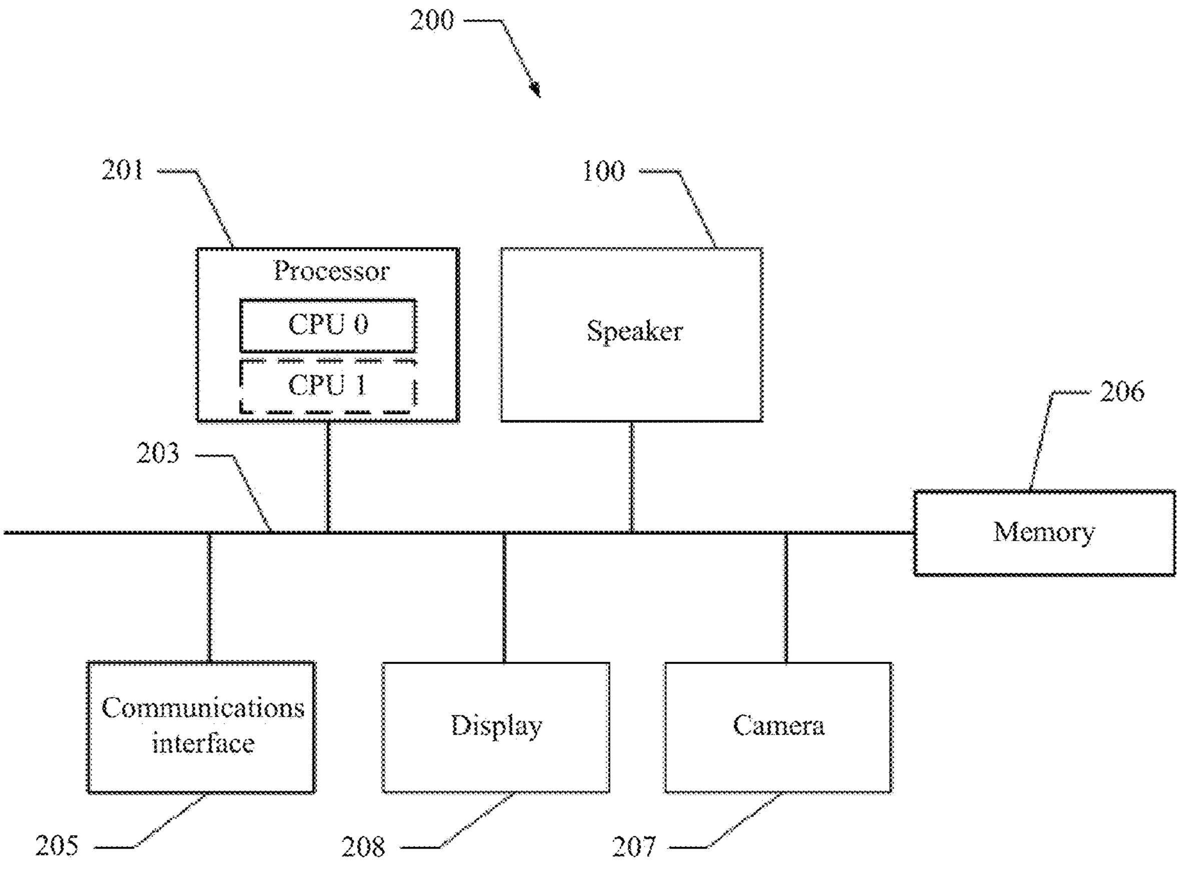
FIG. 5 is a structural block diagram of a terminal according to a first implementation of this application.

FIG. 5 is a structural block diagram of a terminal according to the first implementation of this application. A terminal 200 includes a speaker 100, a processor 201, a communications bus 203, at least one communications interface 205, and a memory 206. The processor 201 is configured to control the speaker 100 to play a sound. The processor 201 is communicatively connected to the speaker 100, the at least one communications interface 205, and the memory 206 through the communications bus 203. The terminal 200 may be any one of a plurality of different types of consumer electronic devices that can be easily held in a hand of a user in a normal use process, or may be a non-portable electronic device. Specifically, the terminal 200 may be an electronic device equipped with a speaker, for example, a cellular phone, a media player, a smartphone, a smart watch, a tablet computer, a personal digital assistant (personal digital assistant, PDA), a desktop computer, or a television.

The processor 201 may be a central processing unit (central processing unit, CPU), and may alternatively be another general-purpose processor, a digital signal processor (digital signal processor, DSP), an application-specific integrated circuit (application-specific integrated circuit, ASIC), a field programmable gate array (field programmable gate array, FPGA), or another programmable logic component, a discrete gate, a transistor logic device, or a discrete hardware component. The general-purpose processor may be a microprocessor, any conventional processor, or the like. As a control center of the terminal 200, the processor 201 is connected to all parts of the entire terminal 200 by using various interfaces and lines. The communications bus 203 may include a path, to transmit information between the foregoing components.

The communications interface 205, which uses any apparatus such as a transceiver, is configured to communicate with another device or a communications network, such as the Ethernet, a radio access network (radio access network, RAN), or a wireless local area network (wireless local area network, WLAN).

The memory 206 may be configured to store a computer program and/or a module. The processor 201 implements various functions of the terminal 200 by running or executing the computer program and/or the module stored in the memory 206 and invoking data stored in the memory 206. The memory 206 mainly includes a program storage area and a data storage area. The program storage area may store an operating system, application programs required by a plurality of functions (such as a sound playback function and an image play function), and the like. The data storage area may store data (such as audio data and a phone book) and the like that are created based on usage of the terminal 200. In addition, the memory 206 may include a high-speed random access memory, and may further include a non-volatile memory, for example, a hard disk, a memory, a plug-connected hard disk, a smart media card (smart media card, SMC), a secure digital (secure digital, SD) card, a flash card (flash card), a plurality of magnetic disk storage devices, a flash memory device, or another volatile solid-state storage device. The memory 206 may exist independently and is connected to the processor 201 by using the communications bus 203. Alternatively, the memory 206 may be integrated with the processor 201.

In a specific implementation, in an embodiment, the terminal 200 may include a plurality of processors 201 such as a CPU 0 and a CPU 1 in FIG. 5. Each of the processors 201 may be a single-core (single-CPU) processor, or may be a multi-core (multi-CPU) processor. The processor herein may be one or more devices, circuits, and/or processing cores configured to process data (for example, computer program instructions).

The terminal 200 may further include a camera 207 configured to capture an image and a display 208 configured to display the image. It may be understood that FIG. 5 shows only an example of the terminal 200, and does not constitute a limitation on the terminal 200. The terminal 200 may include more or fewer components than those shown in FIG. 5, combine some components, or have different component arrangements. For example, the terminal 200 may further include an input/output device and a network access device. This is not limited herein.

Figure 6:
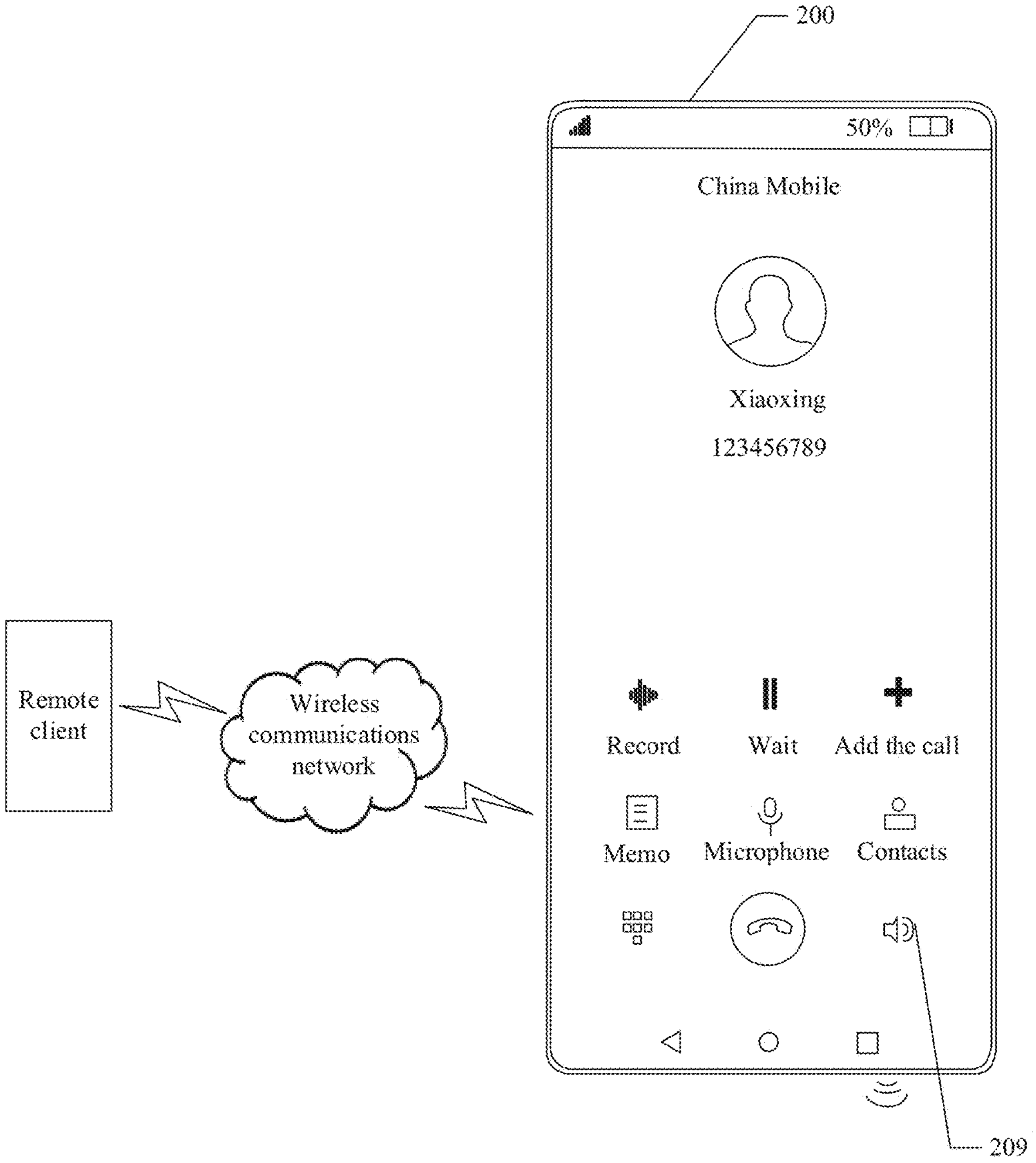
FIG. 6 is a schematic diagram of an application scenario of a terminal.

In an application scenario, as shown in FIG. 6, the terminal 200 is a consumer electronic device such as a smartphone, and the speaker 100 may be a hands-free telephone unit in the terminal 200. In a scenario in which the user calls a remote client by using the terminal 200 through a wireless communications network, when the processor 201 detects a trigger event of a virtual key 209 in a display interface of the terminal 200, the processor 201 controls the speaker 100 to play a sound, to implement a hands-free call. FIG. 6 is only an example application of the terminal 200. This is not limited in this application. For example, in another embodiment, the speaker 100 plays a sound when the terminal 200 performs multimedia playback.

Figure 7:
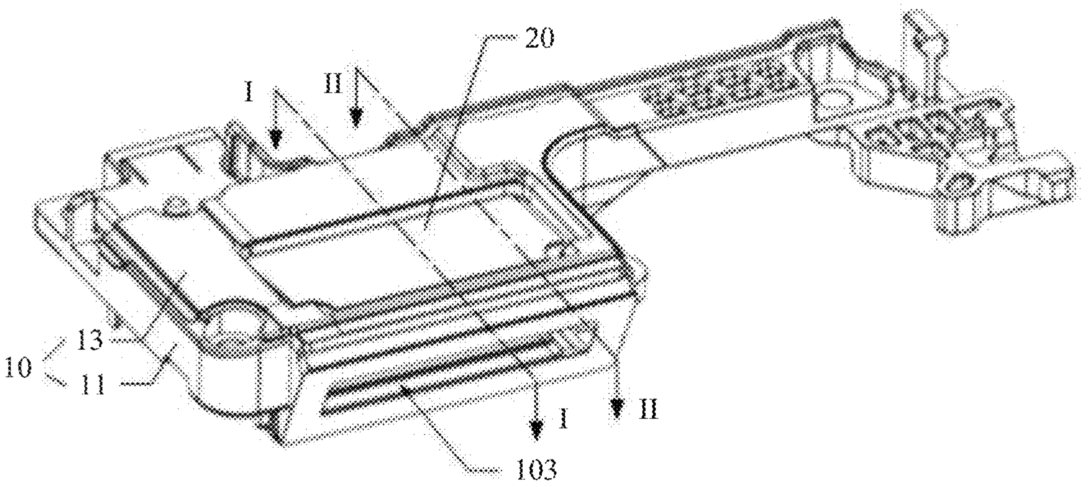
FIG. 7 is a schematic three-dimensional diagram of assembly of a speaker according to the first implementation of this application.

FIG. 7 is a schematic three-dimensional diagram of assembly of the speaker according to the first implementation of this application. The speaker 100 includes an enclosure 10 and a sound production monomer 20. The enclosure 10 includes a first housing 11 and a second housing 13 fastened to the first housing 11. Accommodating space is enclosed by the first housing 11 and the second housing 13 together, and is used to accommodate the sound production monomer 20.

Figure 8:
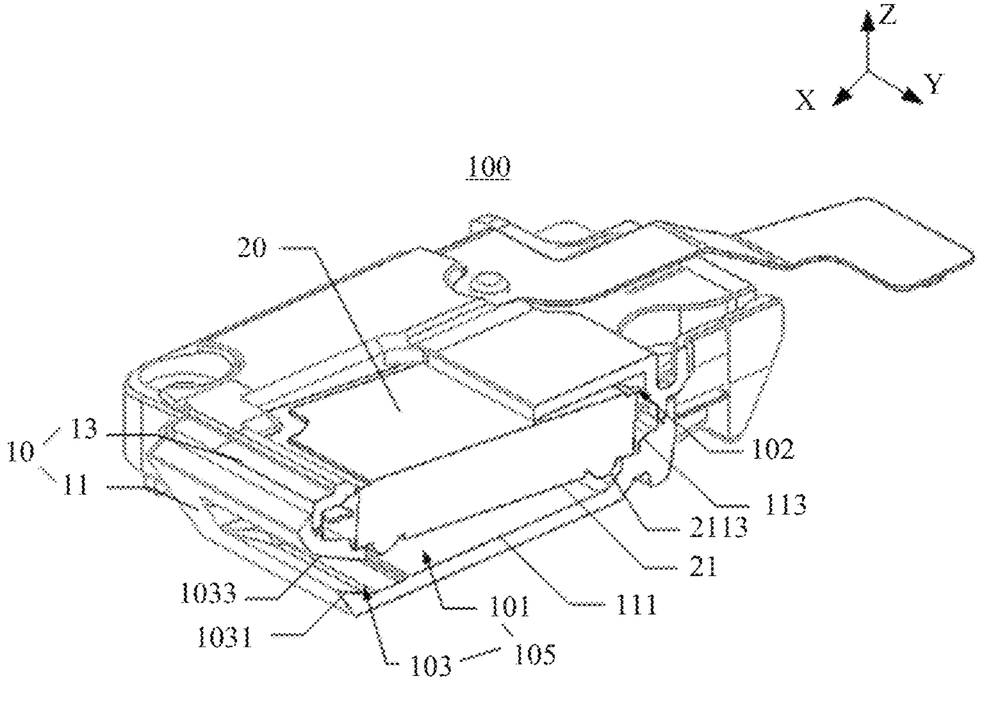
FIG. 8 is a three-dimensional cross-sectional view of the speaker shown in FIG. 7 along an I-I line.

FIG. 8 is a three-dimensional cross-sectional view of the speaker shown in FIG. 7 along an I-I line. The first housing 11 includes a first inner bottom wall 111 and a first inner sidewall 113 fastened to the first inner bottom wall 111. The sound production monomer 20 is accommodated in the first housing 1I and is fastened to the first inner sidewall 113. The sound production monomer 20 includes a diaphragm 21 that vibrates to produce a sound. The diaphragm 21 isolates the accommodating space into a front cavity 101 and a rear cavity 102. The first inner bottom wall 111 is located in the front cavity 101 and is disposed opposite to and spaced from the diaphragm 21 in a first direction (for example, a Z direction shown in FIG. 7). The diaphragm 21 includes a ring 2113 protruding toward the front cavity 101. A sound outlet hole 103 is disposed on the first inner sidewall 113, and the front cavity 101 and the sound outlet hole 103 are connected to form a front cavity channel 105. The diaphragm 21 of the sound production monomer 20 is tilted relative to the first inner bottom wall 111. A diameter of an end of the front cavity 101 that is in communication with the sound outlet hole 103 is greater than a diameter of an end of the front cavity 101 that is away from the sound outlet hole 103.

Generally, a region enclosed by a side of the diaphragm on which the ring is disposed and an inner wall of the enclosure together is a front cavity region, and a region enclosed by a side of the diaphragm that is away from a protruding direction of the ring and the inner wall of the enclosure together is a rear cavity region. The front cavity region is usually used to help control medium- and high-frequency sound quality of the speaker 100, and the rear cavity region is usually used to help control low-frequency sound quality of the speaker. In this implementation, an in-cavity cross-sectional area of the front cavity 101 gradually increases and expands from an end away from the sound outlet hole 103 to a location of the sound outlet hole 103, so that a cross section of the front cavity 101 is roughly horn-shaped.

Figure 9:
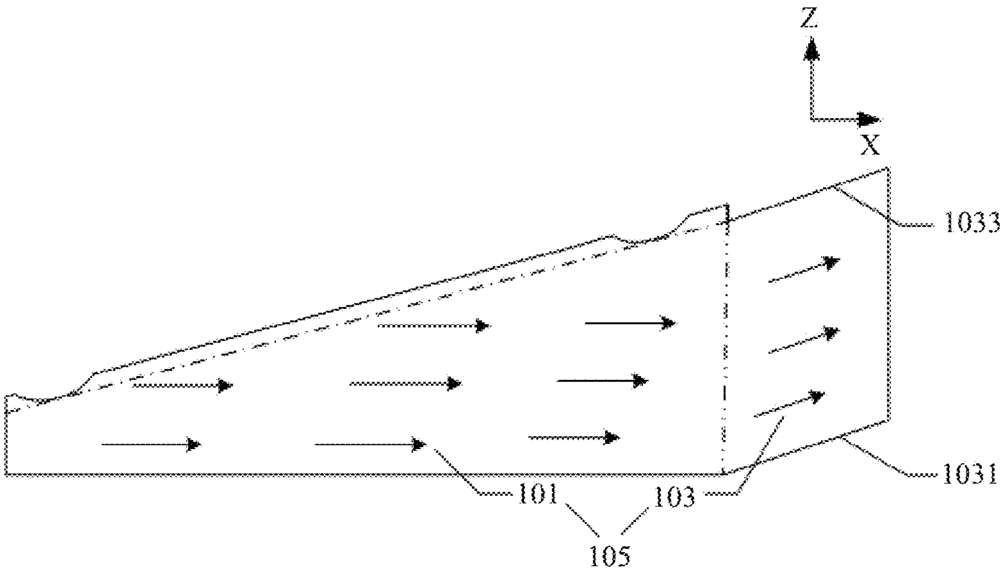
FIG. 9 is a schematic diagram of a front cavity channel.

The diaphragm 21 vibrates to push an airflow to flow from the front cavity 101 to the sound outlet hole 103. FIG. 9 is a schematic cross-sectional view of a front cavity channel. A direction indicated by an arrow in FIG. 9 is an airflow movement direction. To be specific, sound waves generated through vibration of the diaphragm 21 can pass through the front cavity 101 and be propagated to the sound outlet hole 103 for output.

A hole wall of the sound outlet hole 103 includes a first hole wall 1031 and a second hole wall 1033 that are disposed opposite to and roughly parallel to each other. The second hole wall 1033 is fastened to the first inner bottom wall 111, and the first hole wall 1031 and the second hole wall 1033 are tilted relative to a second direction toward a direction away from the first inner bottom wall 111, to guide a flow direction of an airflow, that is, guide sound output. As shown in FIG. 9, on cross sections of the speaker 10 in the first direction and the second direction, the first inner bottom wall 111 is located on one side of an extension line of the first hole wall 1031, the ring 2113 is located on the other side of the extension line that is away from the first inner bottom wall 111, and a shortest distance between the ring 2113 and the extension line is not less than 0, so that impact on an airflow flowing in the front cavity 101 that is caused by the ring 2113 is reduced. In this implementation, a diameter of the front cavity 101 gradually increases from the end of the front cavity 101 that is away from the sound outlet hole 103 roughly to the other end of the front cavity 101 that is in communication with the sound outlet hole 103. Atilt angle of the sound production monomer 20 relative to the first inner bottom wall 111 ranges from 0 degrees to 180 degrees.

Figure 10:
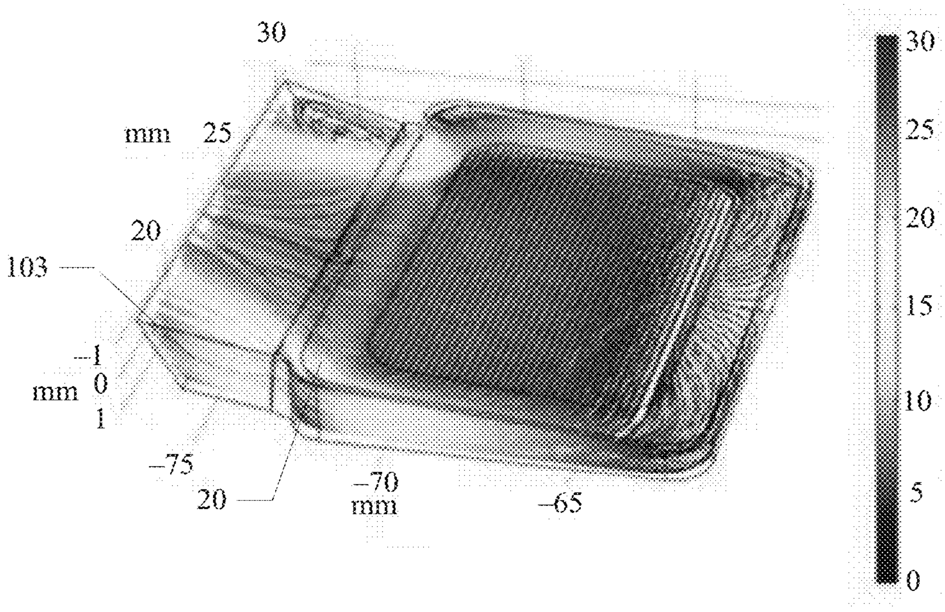
FIG. 10 is a schematic diagram of simulation of an airflow velocity field of the speaker according to the first implementation of this application.
Figure 11:
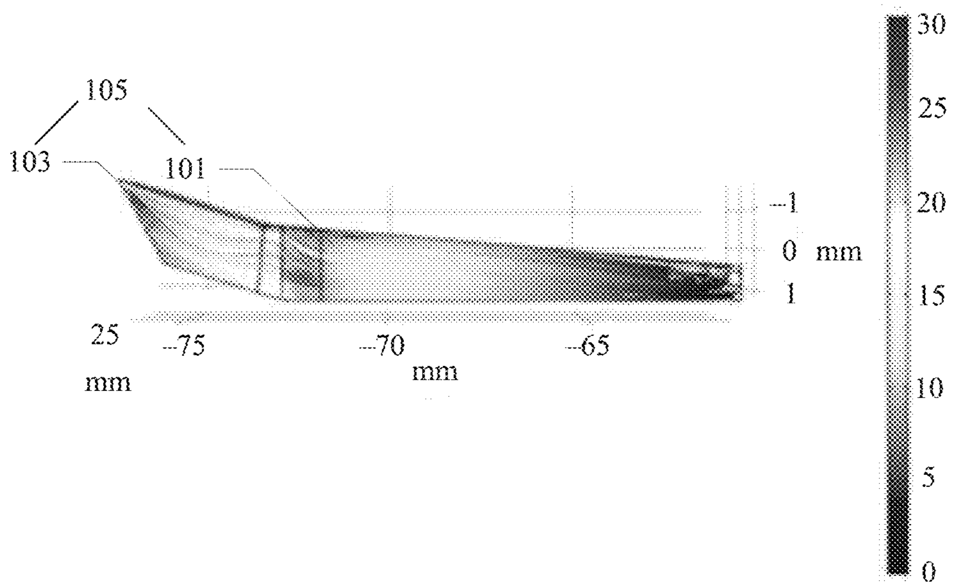
FIG. 11 is another schematic diagram of simulation of an airflow velocity field of the speaker according to the first implementation of this application.

The diaphragm 21 is tilted relative to the first inner bottom wall 111, and the diameter of the end of the front cavity 101 that is in communication with the sound outlet hole 103 is greater than the diameter of the end of the front cavity 101 that is away from the sound outlet hole 103. In other words, an in-cavity cross-sectional area of the end of the front cavity 101 that is in communication with the sound outlet hole 103 is greater than an in-cavity cross-sectional area of the end of the front cavity 101 that is away from the sound outlet hole 103, thereby making an airflow gentle, reducing turbulence intensity, and reducing intensity of a vortex caused by a structural mutation of a side of the diaphragm 21 that is adjacent to the sound outlet hole 103, for example, a structural mutation of the front cavity that is caused by a height of the ring 2113 of the diaphragm 21. Because occurrence possibilities of a vortex and turbulence of the front cavity channel are reduced, noise is reduced, a sound effect of the speaker 100 is improved, and user experience is improved. Referring to FIG. 10 and FIG. 11, an airflow on the front cavity channel 105 is stable and smooth without mutation noise as a whole. Because occurrence possibilities of a vortex and turbulence of the front cavity channel 105 are reduced, noise is reduced, a sound effect of the speaker 100 is improved, and user experience is improved. The sound production monomer 20 is tilted toward the second housing 13 relative to the first inner bottom wall 111, so that low-frequency fullness of amplitude of the diaphragm 21 can be increased, and a sound dynamic range is greatly improved while sound loudness remains unchanged. Because the cross section of the front cavity 101 is roughly an evenly incremented horn-shaped cross section, impact caused by an airflow mutation can be reduced from a perspective of an acoustic source. Amplitude of the speaker 100 is increased by more than 30% compared with that in the conventional technology, and an airflow velocity on a side of the diaphragm 21 is reduced by 50% compared with that in the conventional technology, so that noise and a metal sound caused by an airflow are reduced.

Figure 12:
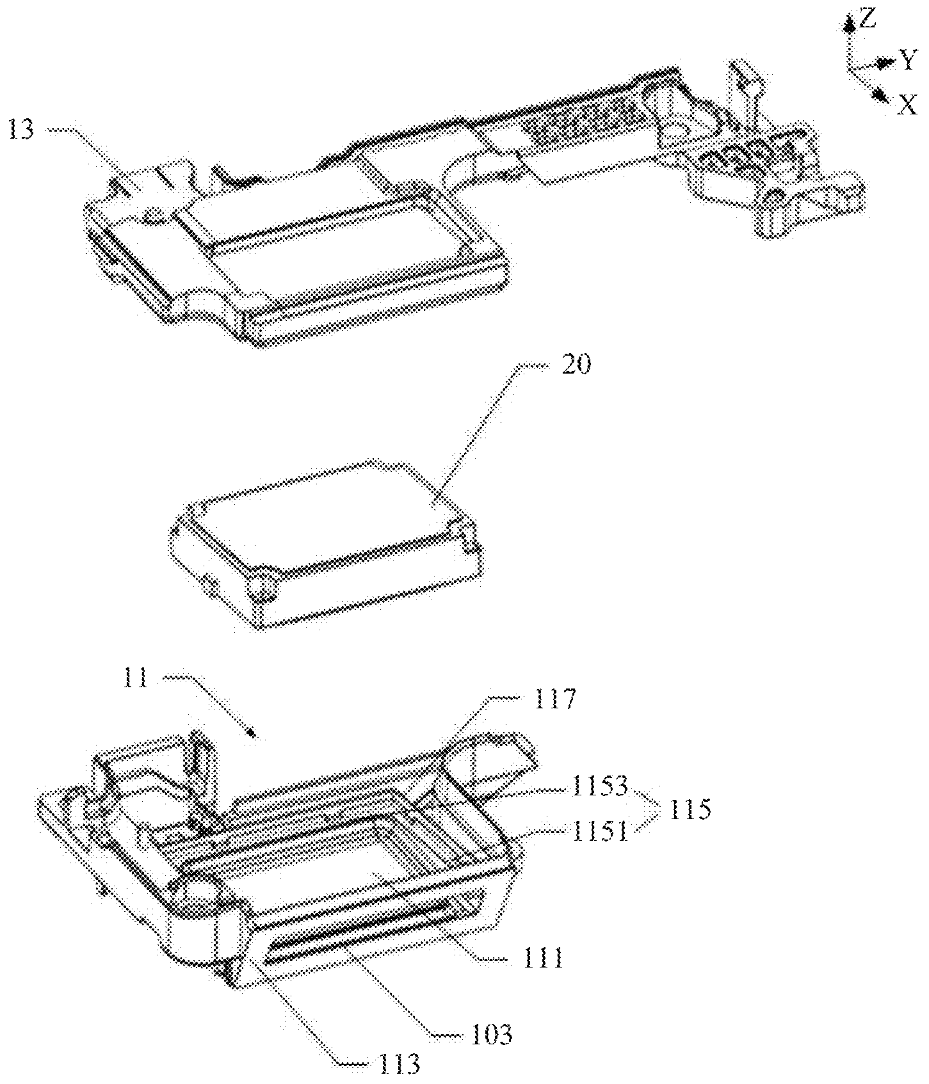
FIG. 12 is a schematic three-dimensional exploded diagram of the speaker shown in FIG. 7.

FIG. 12 is a schematic three-dimensional exploded diagram of the speaker shown in FIG. 7. A first installation console 115 and a stopper console 117 that are arranged in a form of steps are further formed in the first inner sidewall 113. A height of the first installation console 115 relative to the first inner bottom wall 111 is less than a height of the stopper console 117 relative to the first inner bottom wall 111. The stopper console 117 is disposed around the first installation console 115. The first installation console 115 is disposed around the ring 2113, and the stopper console 117 is disposed around the sound production monomer 20. The first installation console 115 includes a top surface disposed opposite to the first inner bottom wall 111. A height of an end of the top surface of the first installation console 115 that is adjacent to the sound outlet hole 103 relative to the first inner bottom wall 111 is greater than a height of an end of the top surface of the first installation console 115 that is away from the sound outlet hole 103 relative to the first inner bottom wall 111. The top surface of the first installation console 115 is fastened to a surface of the diaphragm 21 that faces the first inner bottom wall 111, so that the sound production monomer 20 is tilted relative to the second direction. The first installation console 115 provides a cushion and support for an end of the sound production monomer 20 that is adjacent to the sound outlet hole 103, to improve reliability of the speaker 100. A side surface of the stopper console 117 that is adjacent to the first installation console 115 is glued to a side surface of the sound production monomer 20, so that connection stability between the first housing 11 and the sound production monomer 20 is further improved.

Figure 13:
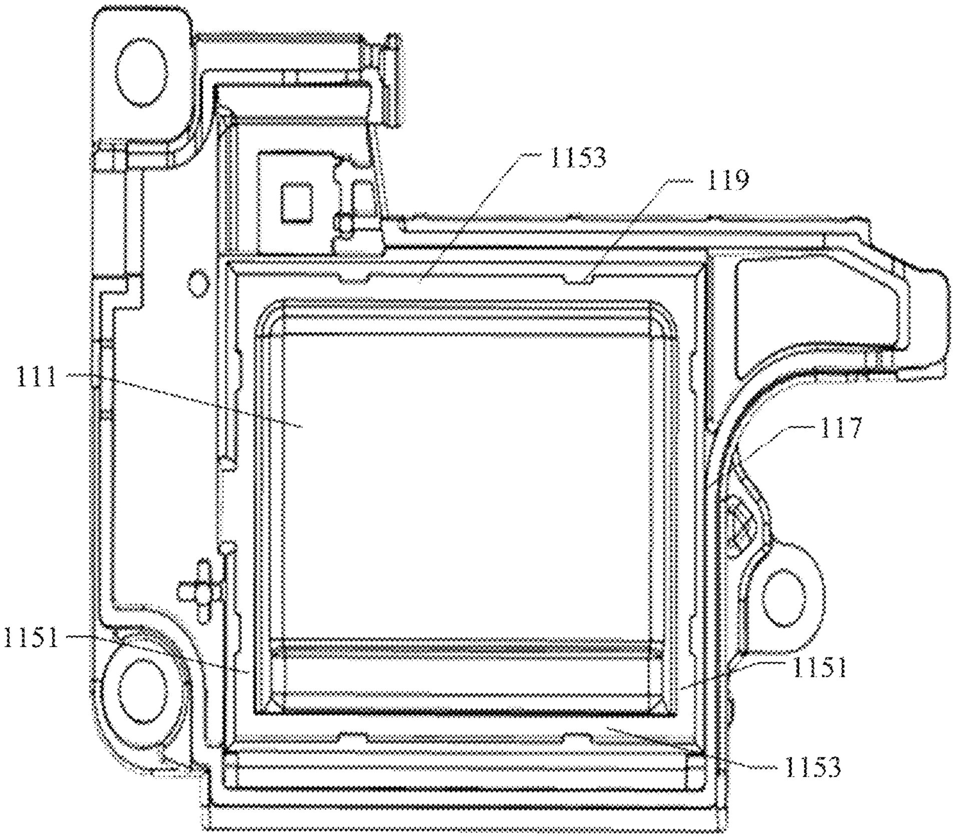
FIG. 13 is a top view of a first housing.

FIG. 13 is a top view of a first housing. The first installation console 115 includes two installation parts 1151 and two first pad parts 1153. Each installation part 1151 is fastened between the two first pad parts 1153, one of the installation parts 1151 is disposed opposite to the sound outlet hole 103, and the sound outlet hole 103 is located between the other installation part 1151 and the first inner bottom wall 111. A height of a top surface of the first pad part 1153 that is away from the first inner bottom wall 111 relative to the first inner bottom wall 111 gradually increases from an end of the first pad part 1153 that is away from the sound outlet hole 103 to an end of the first pad part 1153 that is adjacent to the sound outlet hole 103. In this implementation, the top surface of the first pad part 1153 that is away from the first inner bottom wall 111 is an oblique plane that is tilted relative to the second direction toward a side on which the second housing 13 is located. It may be understood that the top surface of the first pad part 1153 that is away from the first inner bottom wall 111 may be alternatively an oblique curved surface that is tilted relative to the second direction toward a side on which the second housing 13 is located.

Figure 14:
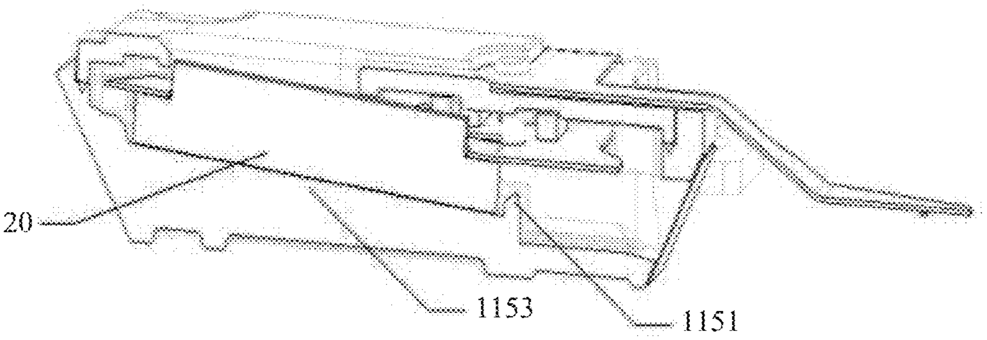
FIG. 14 is a three-dimensional cross-sectional view of the speaker shown in FIG. 7 along an II-II line.

In this implementation, the first inner bottom wall 111 extends roughly in a plane defined by the second direction and a third direction (for example, a Y direction shown in FIG. 12) perpendicular to the first direction. The front cavity channel 105 extends in the second direction, the installation part 1151 extends in the third direction, and the first pad part 1153 extends in the second direction. FIG. 14 is a three-dimensional cross-sectional view of the speaker shown in FIG. 7 along an II-II line. The diaphragm 21 of the sound production monomer 20 abuts against the first pad part 1153, so that connection stability between the enclosure 10 and the diaphragm 21 is improved.

Surfaces of the two installation parts 1151 and the two first pads 1153 that are away from the first inner bottom wall 111 are bonded to a surface of the diaphragm 21 that faces the first inner bottom wall 111, and the side surface of the stopper console 117 that is adjacent to the first installation console 115 is bonded to the side surface of the sound production monomer 20. Surfaces of the two installation parts 1151 and the two first pad parts 1153 that are away from the first inner bottom wall 111 are bonded to a surface of the sound production monomer 20 that faces the first inner bottom wall 111, so that the sound production monomer 20 faces the bottom of the first inner bottom wall 111, and a sealed connection between the sound production monomer 20 and the first housing 13 is implemented, thereby improving water resistance and air tightness of the speaker 100. The side surface of the stopper console 117 that is adjacent to the first installation console 115 is fastened to the sound production monomer 20 by using fixing glue, to improve connection stability between the first housing 11 and the sound production monomer 20.

In an implementation, when the speaker 100 is assembled, the sound production monomer 20 faces the bottom of the first inner bottom wall 111, and a total of four top surfaces that correspond to the two installation parts 1151 and the two first pad parts 1153 and that are away from the first inner bottom wall 111 are coated with sealing glue, to prevent air leakage caused by a glue failure between the diaphragm 21 of the sound production monomer 20 and the first housing 11 during an air tightness test. Four side surfaces of the sound production monomer 20 that correspond to the stopper console 117 and the first installation console 115 are coated with glue, to prevent air tightness of the speaker 100 from being affected by air leakage caused by a gap of sealing glue at the bottom of the sound production monomer 20 during the air tightness test.

Figure 15:
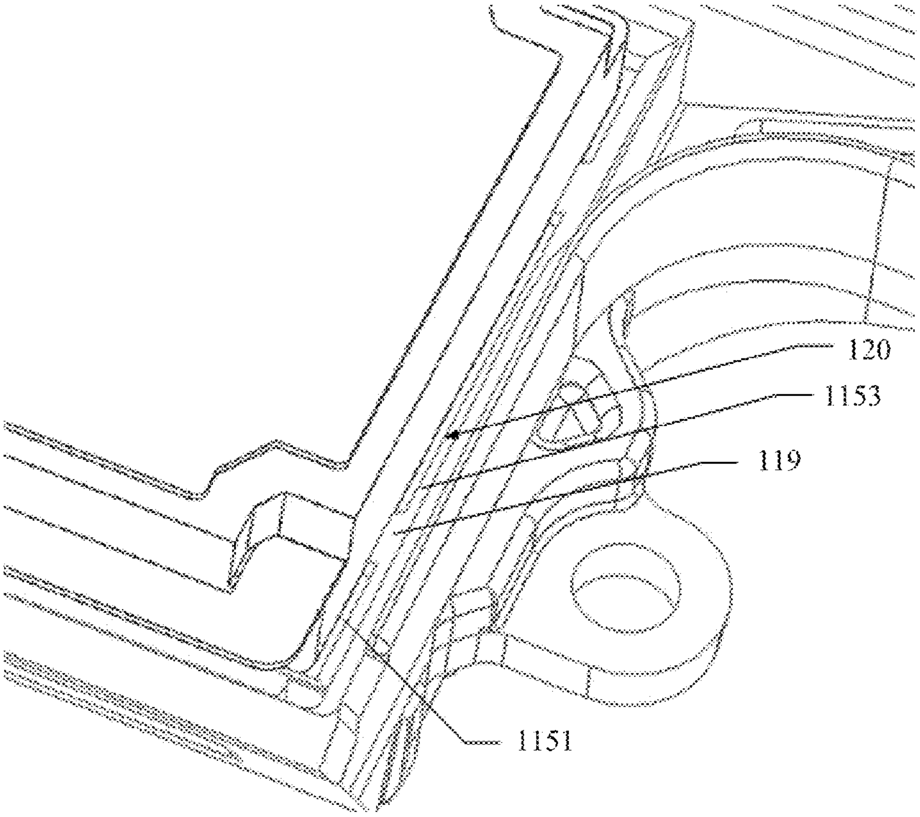
FIG. 15 is a schematic three-dimensional diagram of assembly of a part of structure of a speaker.

The first housing 11 further includes a plurality of locking protrusions 119, the plurality of locking protrusions 119 protrude, at intervals, from a top surface of the first installation console 115 that is away from the first inner bottom wall 111, and the locking protrusions 119 are fastened to the stopper console 117. The locking protrusions 119 are opposed to the sound production monomer 20, so that a possibility that the sound production monomer 20 is loose and shake can be reduced, thereby improving sound quality of the speaker 100. In this implementation, two locking protrusions 119 spaced apart are disposed on each installation part 1151 and each first pad part 1153. FIG. 15 is a schematic three-dimensional diagram of assembly of a part of structure of a speaker. A gluing groove 1157 is formed between adjacent locking protrusions 119 to accommodate glue (not shown), thereby facilitating glue dispensing. It may be understood that a quantity of locking protrusions 119 may be set based on a requirement, and the locking protrusions 119 may be omitted.

It may be understood that the first housing 11 and the sound production monomer 20 may be connected to each other without sealing. The stopper console 117 and the first installation console 115 may be omitted, and instead, the sound production monomer 20 is directly tilted on the first housing 11, and the sound production monomer 20 is fastened to the first inner sidewall 113 of the first housing 11. Alternatively, a part of the first installation console 115 is disposed at an end of the first inner sidewall 113 that is adjacent to the sound outlet hole 103, provided that the first installation console 115 can provide a cushion for the end of the sound production monomer 20 that is adjacent to the sound outlet hole 103.

Figure 16:
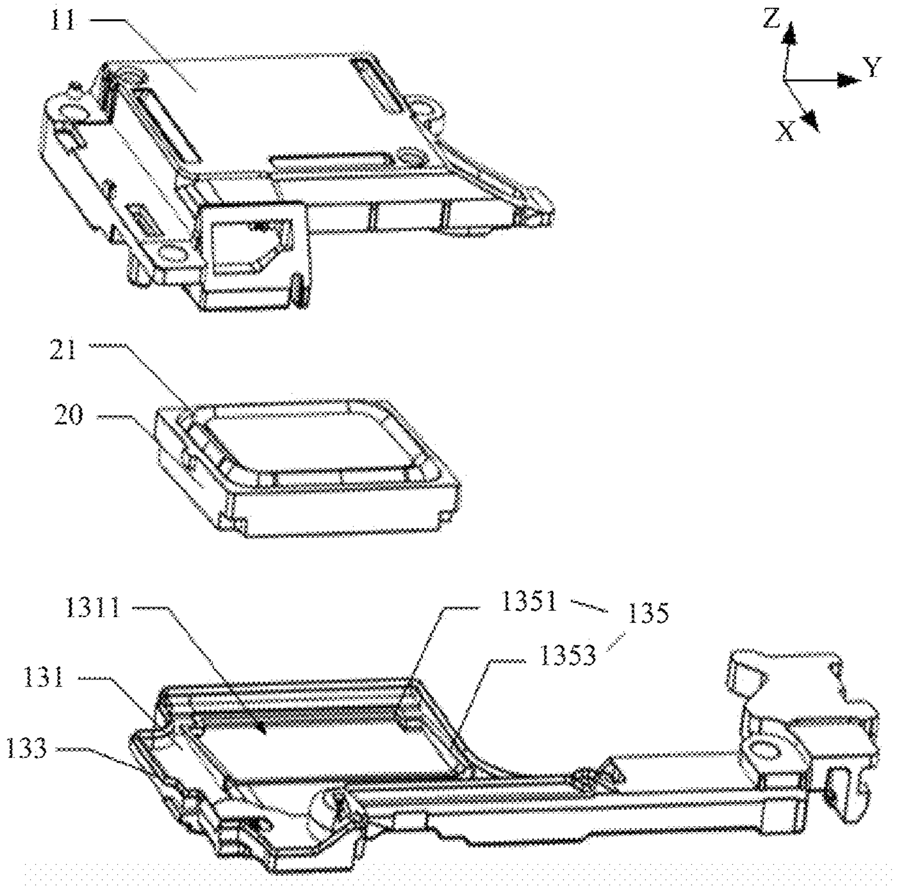
FIG. 16 is a schematic three-dimensional exploded diagram of the speaker shown in FIG. 7 from another perspective.

FIG. 16 is a schematic three-dimensional exploded diagram of the speaker shown in FIG. 7 from another perspective. The second housing 13 includes a second inner bottom wall 131 and a second inner sidewall 133 formed by bending and extending an edge of the second inner bottom wall 131. The second inner sidewall 133 is fastened to an end of the first inner sidewall 113 that is away from the first inner bottom wall 111. The first inner sidewall 113 and the second inner sidewall 133 constitute an inner sidewall of the enclosure 10. A through-hole 1311 is disposed on the second inner bottom wall 131. The second housing 13 further includes a second installation console 135 disposed toward the sound production monomer 20 from the second inner bottom wall 131. The second installation console 135 is disposed around the through-hole 1311. A surface of the second installation console 135 that is away from the second inner bottom wall 131 is glued to a surface of the sound production monomer 20 that is away from the first inner bottom wall 111, to implement a sealed connection between the sound production monomer 20 and the second housing 13.

The second installation console 135 includes two installation parts 1351 and two second pad parts 1353. Each installation part 1351 is fastened between the two second pad parts 1353. The installation part 1351 extends in the third direction, and the second pad part 1353 extends in the second direction. A height of a top surface of the second pad part 1353 that is away from the second inner bottom wall 131 relative to the second inner bottom wall 131 gradually decreases from an end of the second pad part 1353 that is away from the sound outlet hole 103 to an end of the second pad part 1353 that is adjacent to the sound outlet hole 103. In this way, the sound production monomer 20 can be stably accommodated in the enclosure 10, and a possibility that the sound production monomer 20 is loose and shakes can be reduced.

It may be understood that the second housing 13 may be omitted from the enclosure 10, or the first housing 11 and the second housing 13 may be integrated. The sound outlet hole 103 may be disposed on the second inner sidewall 133. The first inner sidewall 113 and the second inner sidewall 133 may be spliced to form the inner sidewall of the enclosure 10, and the sound outlet hole 103 may be disposed on the second inner sidewall 133, or may be partially disposed on the first inner sidewall 113 and partially disposed on the second inner sidewall 133. The enclosure 10 includes a first inner bottom wall and an inner sidewall fastened to the first inner bottom wall. A speaker and a terminal are provided. The speaker includes an enclosure with accommodating space and a sound production monomer fastened in the accommodating space. The sound production monomer has a diaphragm that vibrates to produce a sound, the enclosure includes a first inner bottom wall and an inner sidewall fastened to the first inner bottom wall, the diaphragm is fastened to the inner sidewall to isolate the accommodating space into a front cavity and a rear cavity, the first inner bottom wall is located in the front cavity, and the first inner bottom wall and the diaphragm are disposed opposite to each other and spaced apart in a first direction. The diaphragm includes a ring penetrating toward the front cavity, a sound outlet hole penetrates through the inner sidewall, the front cavity is in communication with the sound outlet hole to form a front cavity channel, and at least one of the sound production monomer and the first inner bottom wall is tilted relative to a second direction. A diameter of an end of the front cavity that is adjacent to the sound outlet hole is greater than a diameter of the other end of the front cavity.

Figure 17:
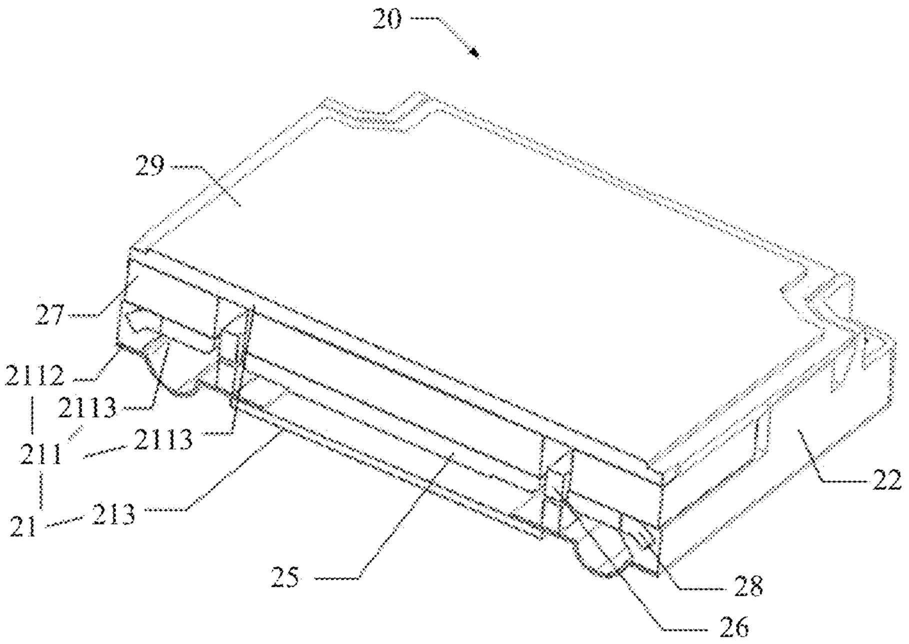
FIG. 17 is a three-dimensional cross-sectional view of a sound production monomer of the speaker according to the first implementation of this application.
Figure 18:
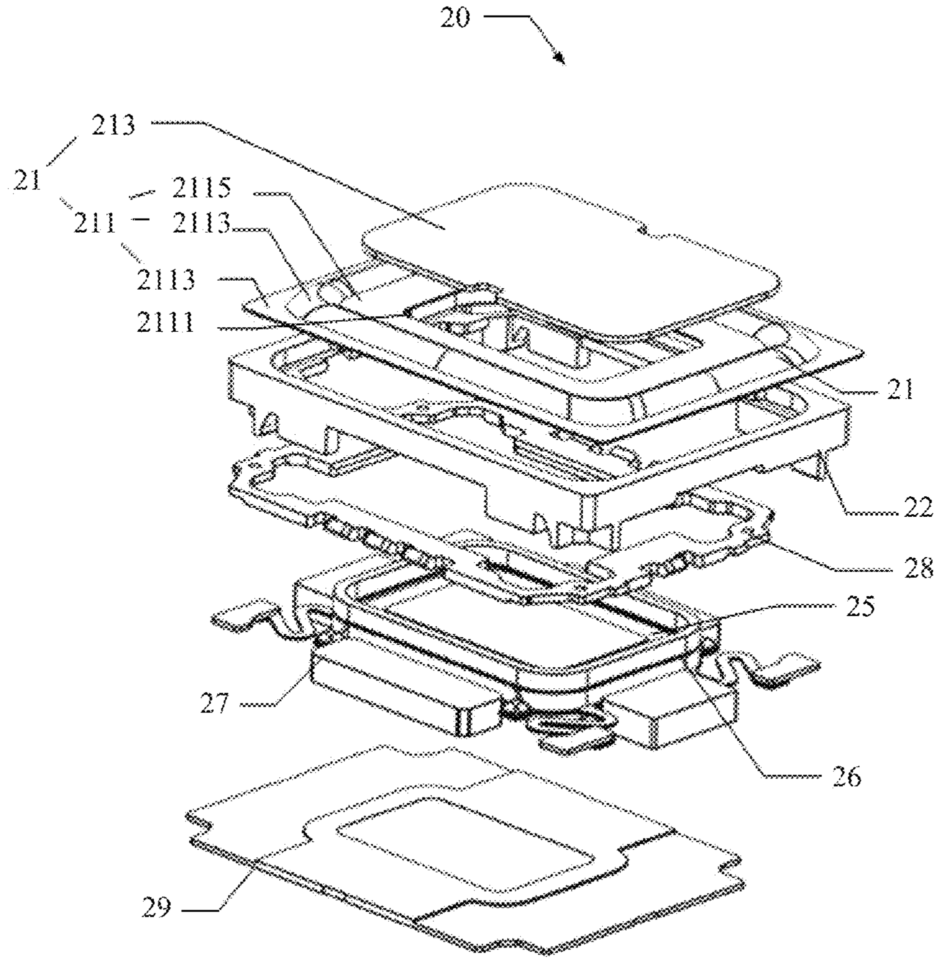
FIG. 18 is a schematic three-dimensional exploded diagram of the sound production monomer of the speaker shown in FIG. 17.

Refer to FIG. 17 and FIG. 18. FIG. 17 is a three-dimensional cross-sectional view of a sound production monomer of the speaker according to the first implementation of this application. FIG. 18 is a schematic three-dimensional exploded diagram of the sound production monomer shown in FIG. 17. In this implementation, the diaphragm 21 includes a main body 211 and a dome 213. A through-hole 2111 is disposed on the main body 211. The main body 211 includes a first connection part 2112, the ring 2113, and a second connection part 2115. The ring 2113 is fastened between the first connection part 2112 and the second connection part 2115, the first connection part 2112 is disposed around the ring 2113, the ring 2113 is disposed around the second connection part 2115, and the second connection part 2115 is disposed around the through-hole 2111. The first connection part 2112 is fastened to the top surface of the first installation console 115 that is away from the first inner bottom wall 111. The dome 213 is fastened to the second connection part 2115 of the main body 211, is disposed toward a surface of the first inner bottom wall 111, and covers the through-hole 2111.

The sound production monomer 20 further includes a basket 22, a first magnet 25, a coil 26, a second magnet 27, a washer 28, and a yoke 29. The main body 211 of the diaphragm 21 is fastened to the basket 22 by using the first connection part 2112. A side surface of the basket 22 is fastened to the stopper console 117. The first magnet 25, the coil 26, the second magnet 27, and the washer 28 are all accommodated in the basket 22. The first magnet 25 is accommodated in the coil 26. The coil 26 is accommodated in the washer 28. There are four second magnets 27, and the four second magnets 27 are disposed around the coil 26. The washer 28 is located between the ring 2113 and the second magnet 27. The yoke 29 is fastened at an end of the basket 22 that is away from the diaphragm 21, and is configured to prevent an element in the basket 22 from detaching from the basket 22. The basket 22 is fastened to the side surface of the stopper console 117 that is adjacent to the first installation console 115. The second magnet 27 is located between the washer 28 and the yoke 29. In this implementation, there are two coils 26. The first magnet 25, the coil 26, and the second magnet 27 constitute a magnetic circuit system of the sound production monomer 20, and the magnetic circuit system is configured to drive the diaphragm 21 to vibrate to produce a sound. It may be understood that quantities of first magnets 25 and second magnets 27 are not limited, a structure of the sound production monomer 20 is not limited, and the first magnet 25 or the second magnet 27 may be omitted. For example, the washer 28 may be omitted.

Second Implementation

Figure 19:
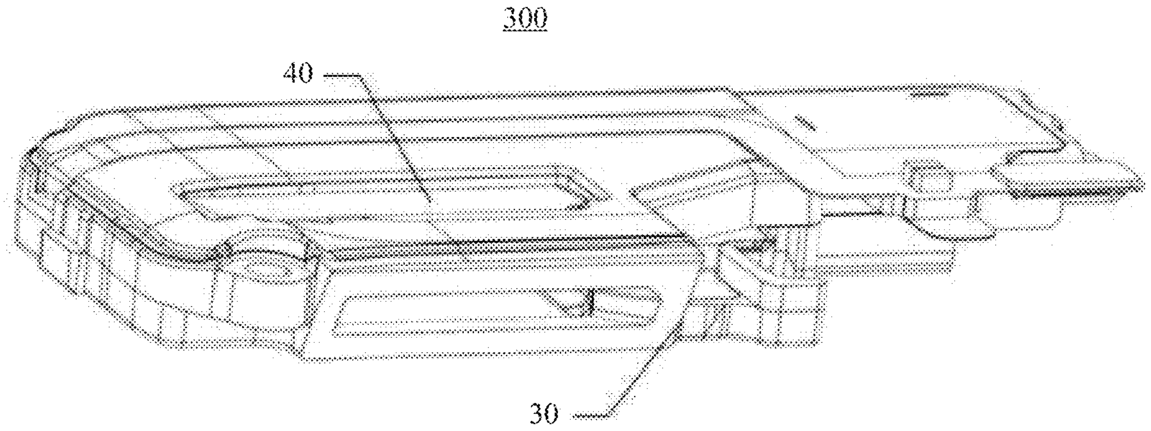
FIG. 19 is a schematic three-dimensional diagram of assembly of a speaker according to a second implementation of this application.
Figure 20:
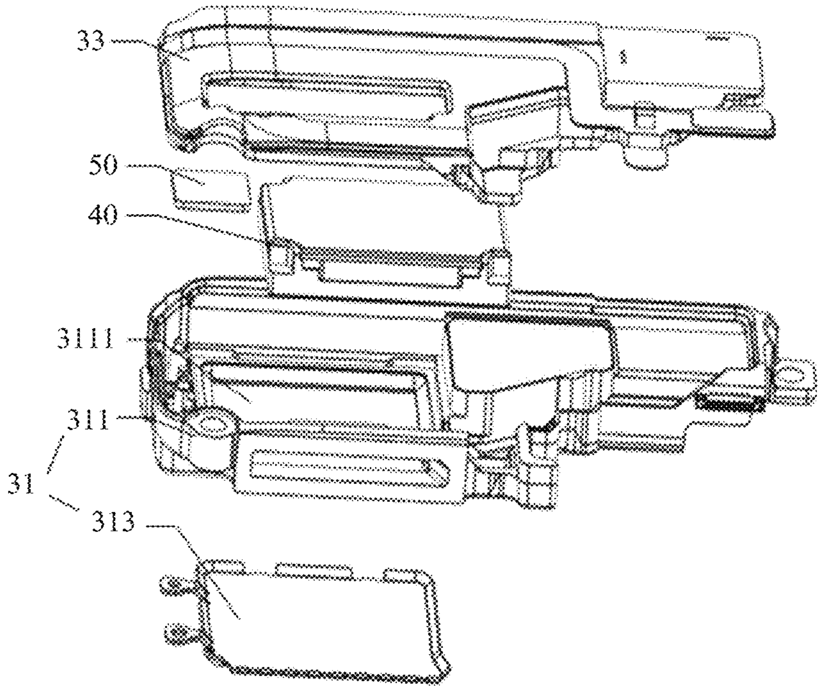
FIG. 20 is a schematic three-dimensional exploded diagram of the speaker shown in FIG. 19.

Refer to FIG. 19 and FIG. 20. FIG. 19 is a schematic three-dimensional diagram of assembly of a speaker according to the second implementation of this application. FIG. 20 is a schematic three-dimensional exploded diagram of the speaker shown in FIG. 19. A structure of a speaker 300 provided in the second implementation is roughly the same as that of the speaker 100 provided in the first implementation. The speaker 300 includes an enclosure 30 and a sound production monomer 40. The enclosure 30 includes a first housing 31 and a second housing 33, the sound production monomer 40 is fastened and accommodated in the first housing 31, and the second housing 33 is capped at an end at which an opening of the first housing 31 is located, and is fastened to the first housing 31. The sound production monomer 40 is tilted toward the second housing 33 relative to a second direction. Differences are as follows: The first housing 31 includes a body 311 and a support plate 313. A through-hole 3111 is disposed on a bottom wall of the body 311, and the support plate 313 is fastened to the body 311, and covers the through-hole 3111. The support plate 313 is disposed opposite to a diaphragm of the sound production monomer 40. Surfaces of the support plate 313 and the body 311 that face the sound production monomer 40 constitute a first inner bottom wall of the first housing 31. Strength of the support plate 313 is greater than strength of the body 311, and a thickness of the support plate 313 is less than a sidewall thickness of the body 311.

In this implementation, the first housing 31 and the second housing 33 are of a plastic material, and the support plate 313 is a steel sheet. Generally, a sidewall thickness of an enclosure of the plastic material is not less than 0.4 mm, to reach required strength and/or rigidity, and a thickness of the support plate 313 of a steel sheet material ranges from 0.15 mm to 0.2 mm, in other words, has excellent strength and rigidity. In other words, the support plate 313 can increase strength of the enclosure 30. Because the support plate 313 is relatively thin, space of the speaker 300 is reduced, and the sound production monomer 40 can dissipate heat more easily. It may be understood that materials of the first housing 31, the second housing 33, and the support plate 313 are not limited.

The speaker 300 further includes a flexible part 50, and the flexible part 50 is sandwiched between a surface of the second housing 33 that faces the sound production monomer 40 and the sound production monomer 40. The flexible part 50 is configured to prevent looseness between the sound production monomer 40 and the second housing 33, so that reliability of the speaker 300 is improved. In this implementation, the flexible part 50 is a crimped foam. In another implementation, the flexible part 50 may be a soft support structure such as an adhesive layer or a sponge.

Figure 21:
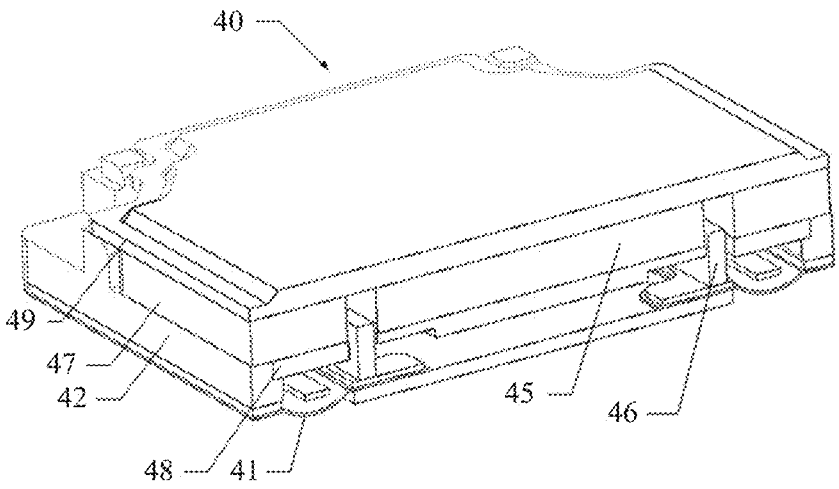
FIG. 21 is a three-dimensional cross-sectional view of a sound production monomer of the speaker according to the second implementation of this application.
Figure 22:
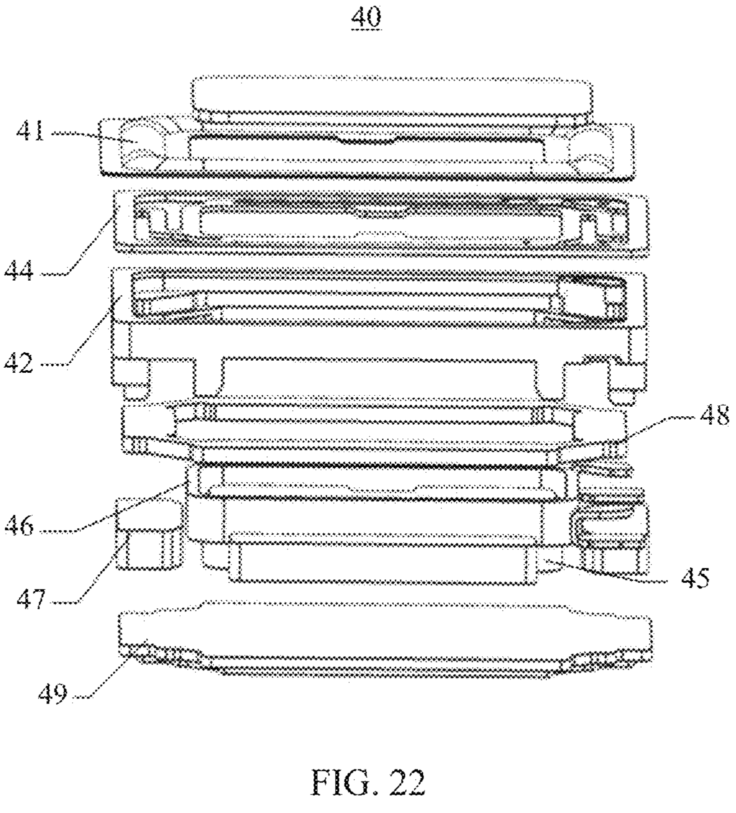
FIG. 22 is a schematic three-dimensional exploded diagram of a sound production monomer of the speaker shown in FIG. 19.

Refer to FIG. 21 and FIG. 22. FIG. 21 is a three-dimensional cross-sectional view of a sound production monomer of the speaker according to the second implementation of this application. FIG. 22 is a schematic three-dimensional exploded diagram of the sound production monomer of the speaker shown in FIG. 21.

In this implementation, the sound production monomer 40 further includes a basket 42, a flexible printed circuit board 44, a first magnet 45, a coil 46, a second magnet 47, a washer 48, and a yoke 49. The diaphragm 41 is fastened to the basket 42. The diaphragm 41 is disposed toward the support plate 313. The flexible printed circuit board 44, the first magnet 45, the coil 46, the second magnet 47, and the washer 48 are all accommodated in the basket 42. The first magnet 45 is accommodated in the coil 46. The coil 46 is accommodated in the flexible printed circuit board 44. The flexible printed circuit board 44 is electrically connected to the coil 46 to supply power to the coil 46. There are four second magnets 47, and the four second magnets 47 are disposed around the coil 46. The washer 48 is located between a dome 43 and the first magnet 45. The yoke 49 is fastened at an end of the basket 42 that is away from the diaphragm 41, and is configured to prevent an element in the basket 42 from detaching from the basket 42. The second magnet 47 is located between the flexible printed circuit board 44 and the yoke 49. In this implementation, there are two coils 46. The first magnet 45, the coil 46, and the second magnet 47 constitute a magnetic circuit system of the sound production monomer 40, and the magnetic circuit system is configured to drive the diaphragm 41 to vibrate to produce a sound.

Third Implementation

Figure 23:
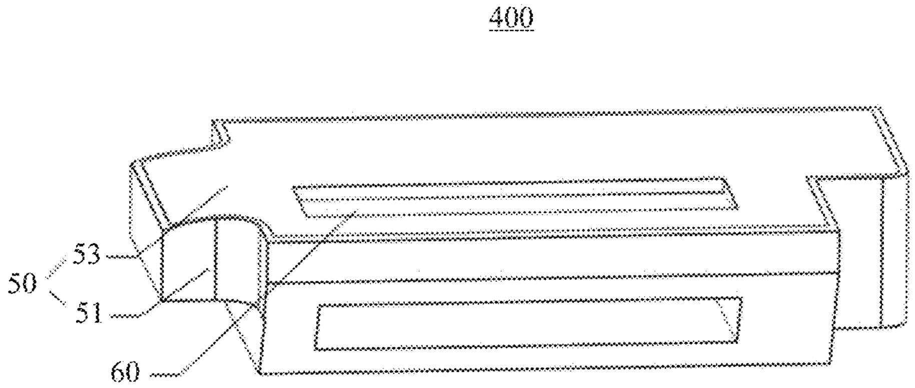
FIG. 23 is a schematic three-dimensional diagram of assembly of a speaker according to a third implementation of this application.
Figure 24:
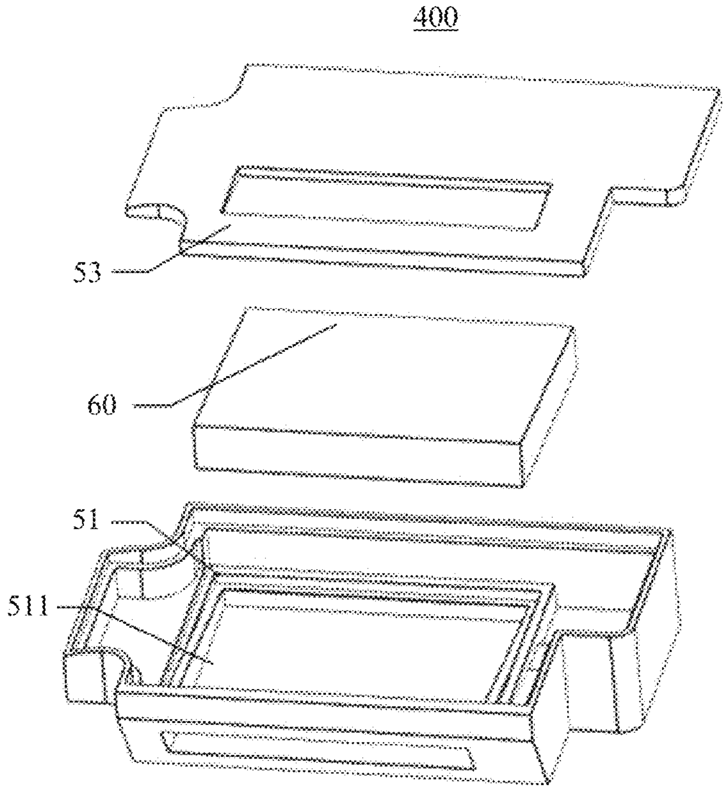
FIG. 24 is a schematic three-dimensional exploded diagram of the speaker shown in FIG. 23.

Refer to FIG. 23 and FIG. 24. FIG. 23 is a schematic three-dimensional diagram of assembly of a speaker according to the third implementation of this application. FIG. 24 is a schematic three-dimensional exploded diagram of the speaker shown in FIG. 23. A structure of a speaker 400 provided in the third implementation is roughly the same as that of the speaker 100 provided in the first implementation. The speaker 400 includes an enclosure 50 and a sound production monomer 60 fastened and accommodated in the enclosure 50. The enclosure 50 includes a first housing 51 and a second housing 53, the sound production monomer 60 is fastened and accommodated in the first housing 51, and the second housing 53 is capped at an end at which an opening of the first housing 51 is located, and is fastened to the first housing 51.

Figure 25:
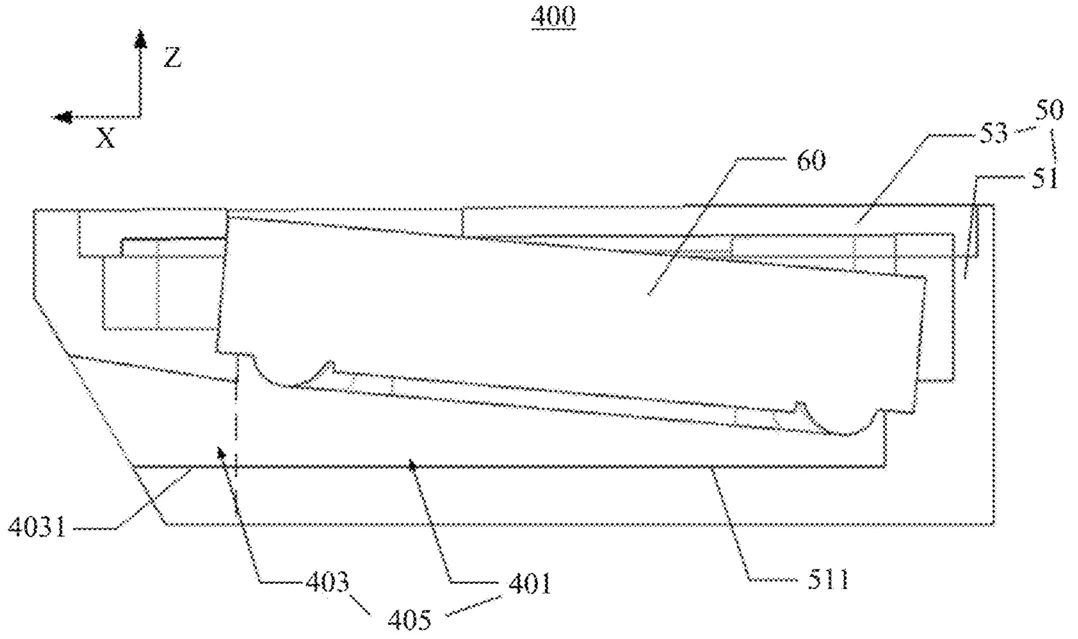
FIG. 25 is a cross-sectional view of the speaker shown in FIG. 23.

Differences are as follows: The second housing 53 is roughly shaped in a flat plate, and the second housing 53 is fastened to the sound production monomer 60. With reference to FIG. 25, in a direction perpendicular to a first inner bottom wall 511, a diameter of a sound outlet hole 403 gradually increases from an end of the sound outlet hole 403 that is adjacent to a front cavity 401 to the other end of the sound outlet hole 403, so that a diameter of a front cavity channel 405 gradually increases from an end of the front cavity 401 that is away from the sound outlet hole 403 to an end of the sound outlet hole 403 that is away from the front cavity 401, in other words, the front cavity channel 405 is roughly horn-shaped, thereby expanding connection space between the sound outlet hole 403 and the front cavity 401, making an airflow gentle, reducing turbulence intensity and noise, and further improving a sound effect of the speaker 400. A first hole wall 4031 of the sound outlet hole 403 and the first inner bottom wall 511 of the first housing 51 are located in a same plane, so that a mutated structure between the front cavity 401 and the sound outlet hole 403 is reduced, thereby reducing a vortex and noise on the front cavity channel 405 and improving a sound effect of the speaker 400.

Fourth Implementation

Figure 26:
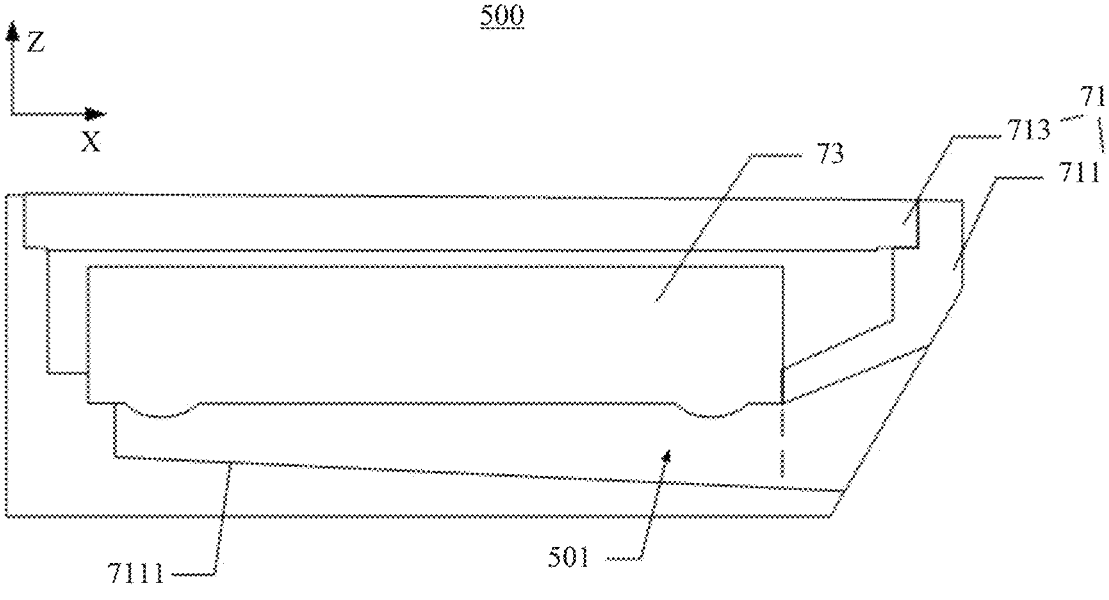
FIG. 26 is a cross-sectional view of a speaker according to a fourth implementation of this application.

FIG. 26 is a cross-sectional view of a speaker according to the fourth implementation of this application. A structure of a speaker 500 provided in the fourth implementation is roughly the same as that of the speaker 300 provided in the third implementation. The speaker 500 includes an enclosure 71 and a sound production monomer 73 fastened and accommodated in the enclosure 71. The enclosure 71 includes a first housing 711 and a second housing 713, the sound production monomer 73 is fastened and accommodated in the first housing 711, and the second housing 713 is capped at an end at which an opening of the first housing 711 is located, and is fastened to the first housing 711. A front cavity 501 extends in a second direction (for example, an X direction in FIG. 26), and the sound production monomer 73 is disposed in the second direction. Differences are as follows: A first inner bottom wall 7111 is tilted relative to the second direction toward a direction away from the second housing 713, and the sound production monomer 73 is still tilted relative to the first inner bottom wall 7111.

Fifth Implementation

Figure 27:
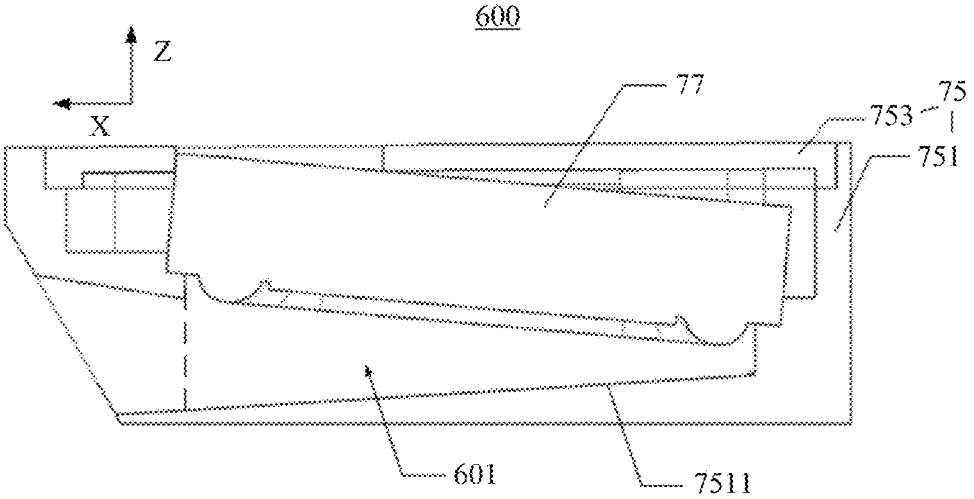
FIG. 27 is a cross-sectional view of a speaker according to a fifth implementation of this application.

FIG. 27 is a cross-sectional view of a speaker according to the fifth implementation of this application. A structure of a speaker 500 provided in the fifth implementation is roughly the same as that of the speaker 300 provided in the third implementation. The speaker 500 includes an enclosure 75 and a sound production monomer 77 fastened and accommodated in the enclosure 75. The enclosure 75 includes a first housing 751 and a second housing 753, the sound production monomer 77 is fastened and accommodated in the first housing 751, and the second housing 753 is capped at an end at which an opening of the first housing 751 is located, and is fastened to the first housing 751. A front cavity 501 extends in a second direction (for example, an X direction in FIG. 27). Differences are as follows: The sound production monomer 77 is tilted relative to the second direction toward a side on which the second housing 753 is located, a first inner bottom wall 7511 is tilted relative to the second direction toward a direction away from the second housing 753, and the sound production monomer 77 is still tilted relative to the first inner bottom wall 7511.

In conclusion, a speaker is provided, including an enclosure with accommodating space and a sound production monomer fastened in the accommodating space. The sound production monomer has a diaphragm that vibrates to produce a sound, the enclosure includes a first inner bottom wall and an inner sidewall fastened to the first inner bottom wall, the diaphragm is fastened to the inner sidewall to isolate the accommodating space into a front cavity and a rear cavity, the first inner bottom wall is located in the front cavity, a sound outlet hole penetrates through the inner sidewall, the front cavity is in communication with the sound outlet hole to form a front cavity channel, the diaphragm is tilted relative to the first inner bottom wall, and in a direction perpendicular to the first inner bottom wall, a diameter of an end of the front cavity that is in communication with the sound outlet hole is greater than a diameter of an end of the front cavity that is away from the sound outlet hole.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A speaker comprising:

an enclosure comprising:

an accommodating space;

a first inner bottom wall;

a first inner sidewall fastened to the first inner bottom wall, and comprising a sound outlet hole; and a first installation console disposed on the first inner sidewall, wherein the first installation console comprises:

a first installation part fastened to the diaphragm; and a first pad part extending in a direction toward the sound outlet hole, wherein a height of a top surface of the first pad part remote from the first inner bottom wall relative to the first inner bottom wall gradually increases from a first end of the first pad part remote from the sound outlet hole to a second end of the first pad part adjacent to the sound outlet hole; and a sound production monomer fastened in the accommodating space, wherein the sound production monomer comprises a diaphragm configured to vibrate to produce sound, wherein the diaphragm is fastened to the first installation console and to the first inner sidewall, dividing the accommodating space into a front cavity and a rear cavity, wherein the first inner bottom wall is located in the front cavity, wherein the front cavity is in communication with the sound outlet hole to form a front cavity channel, wherein the diaphragm is tilted relative to the first inner bottom wall, wherein the diaphragm comprises a ring protruding toward the front cavity, and wherein a first perimeter of a first end of the front cavity that is in communication with the sound outlet hole is greater than a second perimeter of a second end of the front cavity remote from the sound outlet hole.

2. The speaker of claim 1, wherein a perimeter of the front cavity channel gradually increases between the second end of the front cavity toward the first end of the front cavity.

3. The speaker of claim 1, wherein the sound outlet hole comprises:

a first hole wall affixed to the first inner bottom wall; and a second hole wall disposed opposite and roughly parallel to the first hole wall and adjacent to the ring.

4. The speaker of claim 1, further comprising a stopper console disposed on the first inner sidewall around the sound production monomer, and fastened thereto, wherein a first height of the first installation console relative to the first inner bottom wall is less than a second height of the stopper console relative to the first inner bottom wall, and wherein the stopper console and the first installation console define steps.

5. The speaker of claim 4, wherein the enclosure further comprises a plurality of locking protrusions fastened to the stopper console and protruding at intervals from a surface of the first installation console remote from the first inner bottom wall, and wherein the locking protrusions are opposite the sound production monomer.

6. The speaker of claim 5, further comprising a gluing groove enclosed by two adjacent locking protrusions and the stopper console.

7. The speaker of claim 1, wherein the enclosure further comprises:

a first housing comprising:

the first inner bottom wall; and a second inner sidewall fastened to the first inner bottom wall and comprising an end that is remote from the first inner bottom wall; and a second housing fastened to the second inner wall end, wherein the first housing and the second housing define the accommodating space.

8. The speaker of claim 7, wherein the second housing comprises:
a second inner bottom wall; and
a second installation console protruding from the second inner bottom wall and fastened to a first side of the sound production monomer remote from the first inner bottom wall.

9. The speaker of claim 8, wherein the second installation console comprises:
an installation part fastened to a second side of the sound production monomer remote from the diaphragm; and
a second pad part fastened to the installation part, wherein a top surface of the second pad part remote from the second inner bottom wall abuts against the second side, and wherein a height of the top surface relative to the second inner bottom wall gradually decreases from an end of the second pad part remote from the sound outlet hole to an end of the second pad part adjacent to the sound outlet hole.

10. The speaker of claim 7, wherein the first housing comprises:
a body comprising:
an end fastened to the second housing; and
an end having a through-hole and remote from the second housing; and
a support plate disposed opposite the diaphragm, fastened to the body, and covering the through-hole,
wherein the first inner bottom wall comprises a second inner bottom wall that is of the support plate and that is disposed toward the diaphragm, and
wherein a rigidity of the support plate is greater than a rigidity of the body.

11. The speaker of claim 7, further comprising a flexible part located between a surface of the second housing facing the sound production monomer.

12. A terminal comprising:
a processor; and
a speaker electrically coupled to the processor and comprising:
an enclosure comprising:
an accommodating space;
a first inner bottom wall;
a first inner sidewall fastened to the first inner bottom wall, and comprising a sound outlet hole; and
a first installation console disposed on the first inner sidewall, wherein the first installation console comprises:
a first installation part fastened to the diaphragm; and
a first pad part extending in a direction toward the sound outlet hole, wherein a height of a top surface of the first pad part remote from the first inner bottom wall relative to the first inner bottom wall gradually increases from a first end of the first pad part remote from the sound outlet hole to a second end of the first pad part adjacent to the sound outlet hole; and
a sound production monomer fastened in the accommodating space,
wherein the sound production monomer comprises a diaphragm configured to vibrate to produce sound,
wherein the diaphragm is fastened to the first installation console and to the first inner sidewall, dividing the accommodating space into a front cavity and a rear cavity,
wherein the first inner bottom wall is located in the front cavity,
wherein the front cavity is in communication with the sound outlet hole to form a front cavity channel,
wherein the diaphragm is tilted relative to the first inner bottom wall,
wherein the diaphragm comprises a ring protruding toward the front cavity, and
wherein a first perimeter of a first end of the front cavity that is in communication with the sound outlet hole is greater than a second perimeter of a second end of the front cavity remote from the sound outlet hole.

13. The terminal of claim 12, wherein a perimeter of the front cavity channel gradually increases between the second end of the front cavity toward the first end of the front cavity.

14. The terminal of claim 12, wherein the sound outlet hole comprises:
a first hole wall affixed to the first inner bottom wall; and
a second hole wall disposed opposite and roughly parallel to the first hole wall and adjacent to the ring.

15. The terminal of claim 12, wherein the speaker further comprises a stopper console disposed on the first inner sidewall around the sound production monomer and fastened thereto, wherein a first height of the first installation console relative to the first inner bottom wall is less than a second height of the stopper console relative to the first inner bottom wall, and wherein the stopper console and the first installation console define steps.

16. The terminal of claim 15, wherein the enclosure further comprises a plurality of locking protrusions fastened to the stopper console protruding at intervals from a surface of the first installation console remote from the first inner bottom wall, and wherein the locking protrusions are opposite the sound production monomer.

17. The terminal of claim 16, further comprising a gluing groove enclosed by two adjacent locking protrusions and the stopper console.

18. The terminal of claim 12, wherein the enclosure further comprises:
a first housing comprising:
the first inner bottom wall; and
a second inner sidewall fastened to the first inner bottom wall and comprising an end that is remote from the first inner bottom wall; and
a second housing fastened to the second inner wall end,
wherein the first housing and the second housing define the accommodating space.

19. The terminal of claim 18, wherein the second housing comprises:
a second inner bottom wall; and
a second installation console protruding from the second inner bottom wall and fastened to a first side of the sound production monomer remote from the first inner bottom wall.

20. The terminal of claim 19, wherein the second installation console comprises:
an installation part fastened to a second side of the sound production monomer remote from the diaphragm; and
a second pad part fastened to the installation part, wherein a top surface of the second pad part remote from the second inner bottom wall abuts against the second side, and wherein a height of the top surface relative to the second inner bottom wall gradually decreases from an end of the second pad part remote from the sound outlet hole to an end of the second pad part adjacent to the sound outlet hole.

* * * * *